(12) United States Patent
Hempton et al.

(10) Patent No.: US 10,938,766 B2
(45) Date of Patent: *Mar. 2, 2021

(54) SYSTEM AND METHOD FOR AUTOMATICALLY MANAGING EMAIL COMMUNICATIONS USING INDIRECT REPLY IDENTITY RESOLUTION

(71) Applicant: Outreach Corporation, Seattle, WA (US)

(72) Inventors: Gordon L. Hempton, Seattle, WA (US); Wesley R. Hather, Seattle, WA (US); Andrew S. Kinzer, Seattle, WA (US); Manuel A. Medina, Seattle, WA (US)

(73) Assignee: OUTREACH CORPORATION, Seattle, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/677,552

(22) Filed: Nov. 7, 2019

(65) Prior Publication Data

US 2020/0076760 A1 Mar. 5, 2020

Related U.S. Application Data

(63) Continuation of application No. 15/950,370, filed on Apr. 11, 2018, now Pat. No. 10,505,882.

(51) Int. Cl.
*H04L 12/58* (2006.01)
*G06F 16/27* (2019.01)
*G06F 16/23* (2019.01)

(52) U.S. Cl.
CPC .......... *H04L 51/22* (2013.01); *G06F 16/2365* (2019.01); *G06F 16/275* (2019.01); *H04L 51/12* (2013.01); *H04L 51/34* (2013.01)

(58) Field of Classification Search
CPC ......... H04L 51/12; H04L 51/02; H04L 51/14; H04L 51/16; H04L 51/24; H04L 51/22; H04L 51/046; H04L 67/02; G06F 17/2335; G06F 3/04817
See application file for complete search history.

(56) References Cited

U.S. PATENT DOCUMENTS

| 9,559,997 B1* | 1/2017 | Everton | H04L 51/10 |
| 10,505,882 B2* | 12/2019 | Hempton | H04L 51/22 |
| 2016/0328803 A1* | 11/2016 | Whitley | H04L 51/30 |
| 2018/0253659 A1* | 9/2018 | Lee | H04L 51/22 |

* cited by examiner

*Primary Examiner* — Kim T Nguyen
(74) *Attorney, Agent, or Firm* — Fenwick & West LLP

(57) ABSTRACT

Methods and systems are enclosed herein for automatically managing email communication between a group of users and a group of target prospects. A sequence of outbound emails is automatically sent on behalf of a user to a prospect. Based upon the prospect's inbound replies (or lack thereof) the system will perform preconfigured actions, such as stopping automated communications and deferring to the user for manual action.

20 Claims, 11 Drawing Sheets

| Conditions | Classification |
|---|---|
| Subject prefixed with:<br>    "Ooto"<br>    "Auto"<br>    "Ooo" | Out of the office |
| Subject contains<br>    "automatic reply"<br>    "auto response"<br>    "out of office"<br>    "out of the office"<br>    "away from my mail"<br>    "on leave"<br>    "sick leave" | Out of the office |
| First 80 characters of body contains:<br>    "out of office"<br>    "out of the office"<br>    "away from my mail"<br>    "on leave"<br>    "sick leave"<br>    "maternity leave" | Out of the office |
| Message header contains:<br>    "Auto-submitted" with value "no"<br>    "X-autoreply"<br>    "X-autorespond"<br>    "X-mdautoresponse" | Out of the office |
| Sender email prefixed with:<br>    "Mailer-daemon"<br>    "Mailerdaemon"<br>    "postmaster" | Bounce |
| Subject prefixed with:<br>    "Undeliverable"<br>    "failed mail"<br>    "failed delivery"<br>    "mail delivery fail"<br>    "mail system error"<br>    "failure notice"<br>    "Nondeliverable"<br>    "delivery status notification (failure)" | Bounce |
| Message header "in_reply_to" or "references" contains a message_id of an Outreach message | Reply |
| Body contains Outreach tracking links from a previously delivered message | Reply |
| A previously delivered (non replied) Outreach message to the sender contains the subject of this message | Reply |

FIG. 3

| | |
|---|---|
| Monday | 9am - 6pm PST |
| Tuesday | 12pm - 2pm PST |
| Wednesday | 12pm - 2pm PST |
| Thursday | 9am - 6pm PST |
| Friday | 9am - 6pm PST |
| Saturday | |
| Sunday | |

901a — (Monday row); 902a — (9am-6pm PST row)
901b — (Tuesday row)
901c — (Saturday row); 902b — (Saturday empty cell)

SYSTEM AND METHOD FOR AUTOMATICALLY MANAGING EMAIL COMMUNICATIONS USING INDIRECT REPLY IDENTITY RESOLUTION

FIELD

The present invention relates to email communication.

BACKGROUND

This disclosure relates to a method and system for automatically managing email communication between a group of users and a group of target prospects. Email is ubiquitous, and the application of this is relevant to a large number of fields, but-for the purposes of simplicity-specific examples in this document will be limited to the sales industry.

Managing email relationships with a large number of people (prospects) is central to the role of a sales professional. In many cases, an individual may be reaching out to hundreds of prospects simultaneously. In order to be effective, each individual thread of communication must be maintained and followed up on. Moreover, the response (or lack of response) from a prospect requires action by the sales professional. This could include, but is not limited to, updating data within a Customer Relationship Management system or setting up future follow-up activities. Traditionally, these actions are done manually and require considerable effort on the part of the sales person. In the event of a lack of response from a prospect, the future action of following up can be forgotten or missed-leading to decreased effectiveness and excess labor costs.

In the context of a sales organization involving a large number of sales personnel, coordinating communication across the entirety of the team becomes increasingly important. If a sales professional within an organization is reaching out to an individual, it is desirable to know if anyone else from that organization has reached out to the same individual in order to drive strategy in the sales process. If multiple sales personnel are reaching out the same individual simultaneously, it is important to ensure that both efforts are mutually known and coordinated.

Standard email servers and clients do not provide functionality for multiple inboxes to be synchronized simultaneously nor do they provide the ability to automate actions or consume information based on the data provided by all inboxes within an organization.

Accordingly, what is needed is a system to automate the initial correspondences, bring down emails from all email mailboxes within an organization, and to store and process the data in a manner that enables the automation and efficient display of the data.

SUMMARY OF THE INVENTION

Methods and systems are enclosed herein for automatically managing email communication between a group of users and a group of target prospects. The system provides a user interface for managing the complexity of dealing with multiple inboxes and recipients simultaneously as well as customizable automation based upon the email content, recipients, and other metadata.

In one embodiment, an automated system is put in place to enable the user to send a series (or "sequence") of automated or manual emails to specific recipients. These sequences are constructed as a number of "steps" consisting of templated email content. A template contains variables that are automatically populated from an underlying database containing additional information about intended recipients.

Underlying this is a system which maintains connections to email mailboxes on behalf of many users. These mailboxes are periodically queried for new email messages on a continual basis. In the event of a new message, the message is checked for relation to a particular sequence. The system may contain logic to stop the delivery of a sequence conditioned on certain recipient behavior, such as replying to a message.

BRIEF DESCRIPTION OF THE DRAWINGS

FIG. 3 is a table showing how an embodiment of the system classifies inbound emails in accordance with the present invention.

FIG. 9 is a chart illustrating delivery schedule blocks.

DETAILED DESCRIPTION OF ONE OR MORE EMBODIMENTS

Systems and methods that implement the embodiments of the various features of the present invention will now be described with reference to the drawings. The drawings and the associated descriptions are provided to illustrate some embodiments of the present invention and not to limit the scope of the present invention. Throughout the drawings, reference numbers are reused to indicate correspondence between referenced elements.

Figure 1:
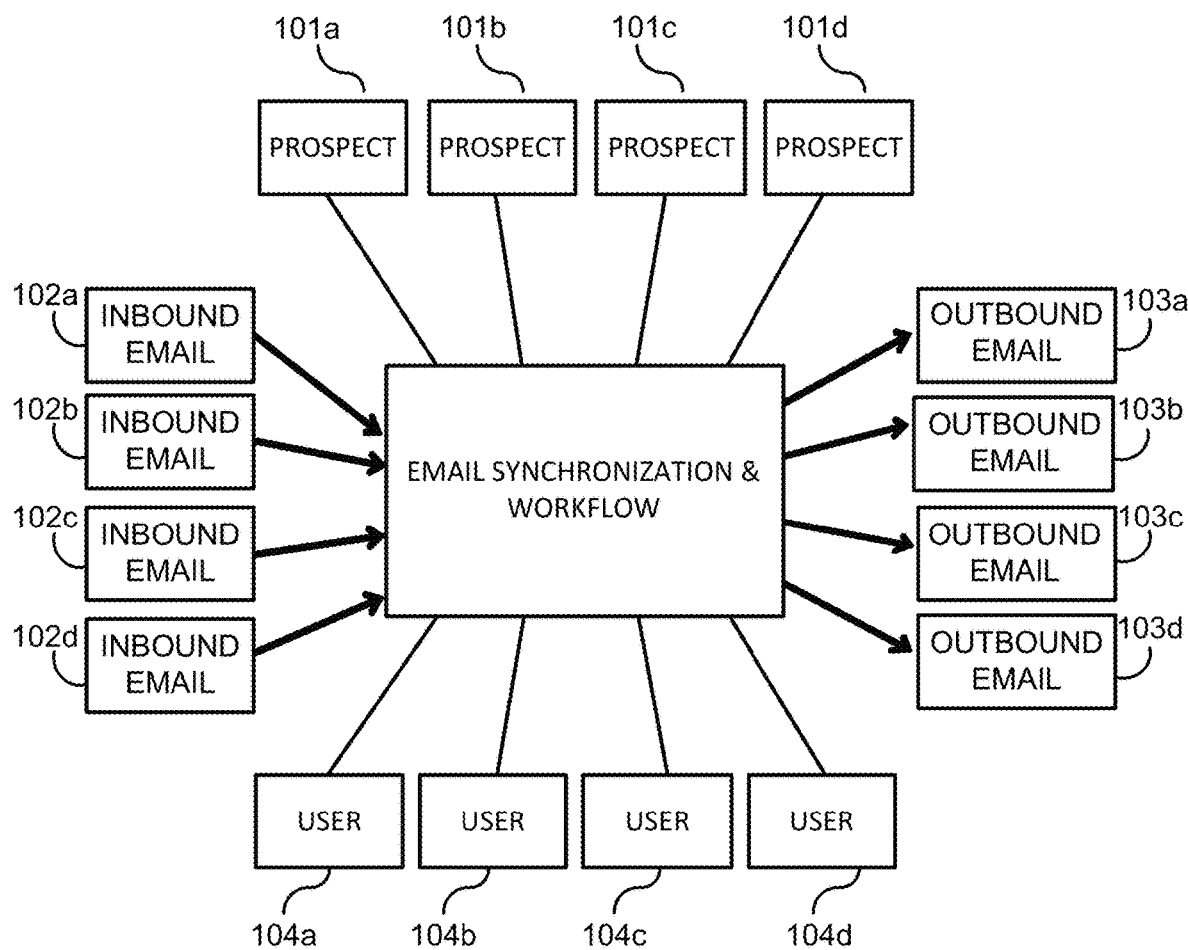
FIG. 1 is a schematic diagram showing a high-level overview of an email communication system in accordance with the present invention.

Referring to FIG. 1, an email synchronization and workflow system 100 is provided. A plurality of users 104a, 104b, 104c, and 104d are shown in FIG. 1. In accordance with the present invention, any number of users 104a, 104b, 104c, and 104d may be provided; and only four users are shown in the illustrated example for the sake of clarity. In the illustrated example, the users 104a, 104b, 104c, and 104d may be sales personnel who need to contact potential customers via email to sell a product or service. The email synchronization and workflow system 100 is operative to establish communications with prospects 101a, 101b, 101c, and 101d. In accordance with the present invention, any number of prospects 101a, 101b, 101c, and 101d may be provided; and only four prospects are shown in the illustrated example for the sake of clarity. As explained herein, the system 100 will automatically manage the delivery of outbound emails 103*a*, 103*b*, 103*c*, and 103*d*, while simultaneously managing inbound emails 102*a*, 102*b*, 102*c*, and 102*d*. The number of inbound emails 103*a* and outbound emails 102*a* that can be handled by a system in accordance with the present invention is not limited. For the sake of clarity, only four of each are shown in the illustrated example.

Figure 1A:
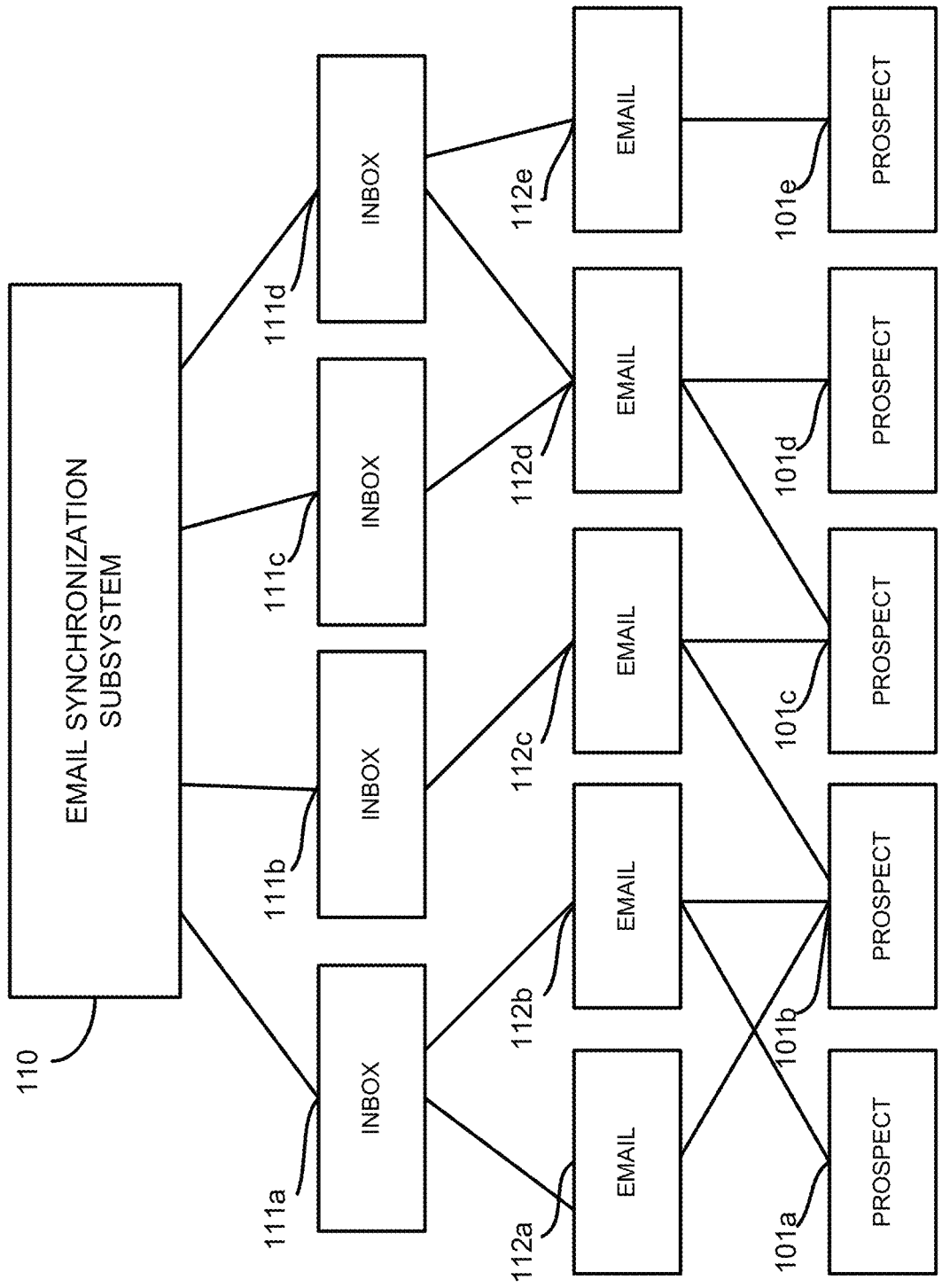
FIG. 1a is a schematic diagram showing an overview of the email synchronization sub system.

Referring to FIG. 1*a*, an email synchronization subsystem 110 is provided. A plurality of email inboxes 111*a*, 111*b*, 111*c*, and 111*d* are shown in FIG. 1*a*. In the illustrated example, the inboxes 111*a*, 111*b*, 111*c*, and 111*d* may correspond to a user, for example 104*a* or user 104*b* shown in FIG. 1, on a many-to-one basis; (one user may have one or more configured inboxes). These inboxes 111*a*, 111*b*, 111*c*, and 111*d* may correspond to the sales personnel's corporate email account. The email synchronization and processing system 110 is operative to providing the necessary capability to process inbound messages 112*a*, 112*b*, 112*c*, and 112*d* from prospects 101*a*, 101*b*, 101*c*, and 101*d*.

In the illustrated example, communication with inboxes 111*a*, 111*b*, 111*c*, and 111*d* is established programmatically and happens on a continual basis to achieve real-time access to new emails. An independent connection is made to each separate inbox, for example inbox 111*a*, and new emails 112*a*, 112*b*, 112*c*, 112*d*, and 112*e* are received by the system 100 as they are delivered to a corresponding mailbox 111*a*. The communication can take place over a variety of protocols depending on the underlying email server on which the inbox 111*a* is located.

In practice, many customers have email servers provided by Google Apps. In the case of an email server provided by Google Apps, the communication protocol with the inbox 111*a* is configurable and can be done via the Internet Message Access Protocol (IMAP) on a polling basis or via the Google-specific GMail API on a push basis. Other customers have on-premise or cloud-hosted Microsoft Exchange email servers. In that case, inbox synchronization is done via Exchange Web Services (EWS).

A key distinction between the email synchronization subsystem 110 and typical applications of the IMAP, EWS, or the GMail API lies in the treatment of multiple inboxes 111*a*, 111*b*, 111*c*, and 111*d* simultaneously. In general, neither IMAP, EWS, nor the GMail API provides functionality to sync multiple inboxes, requiring each mailbox to be synchronized independently.

Figure 1B:
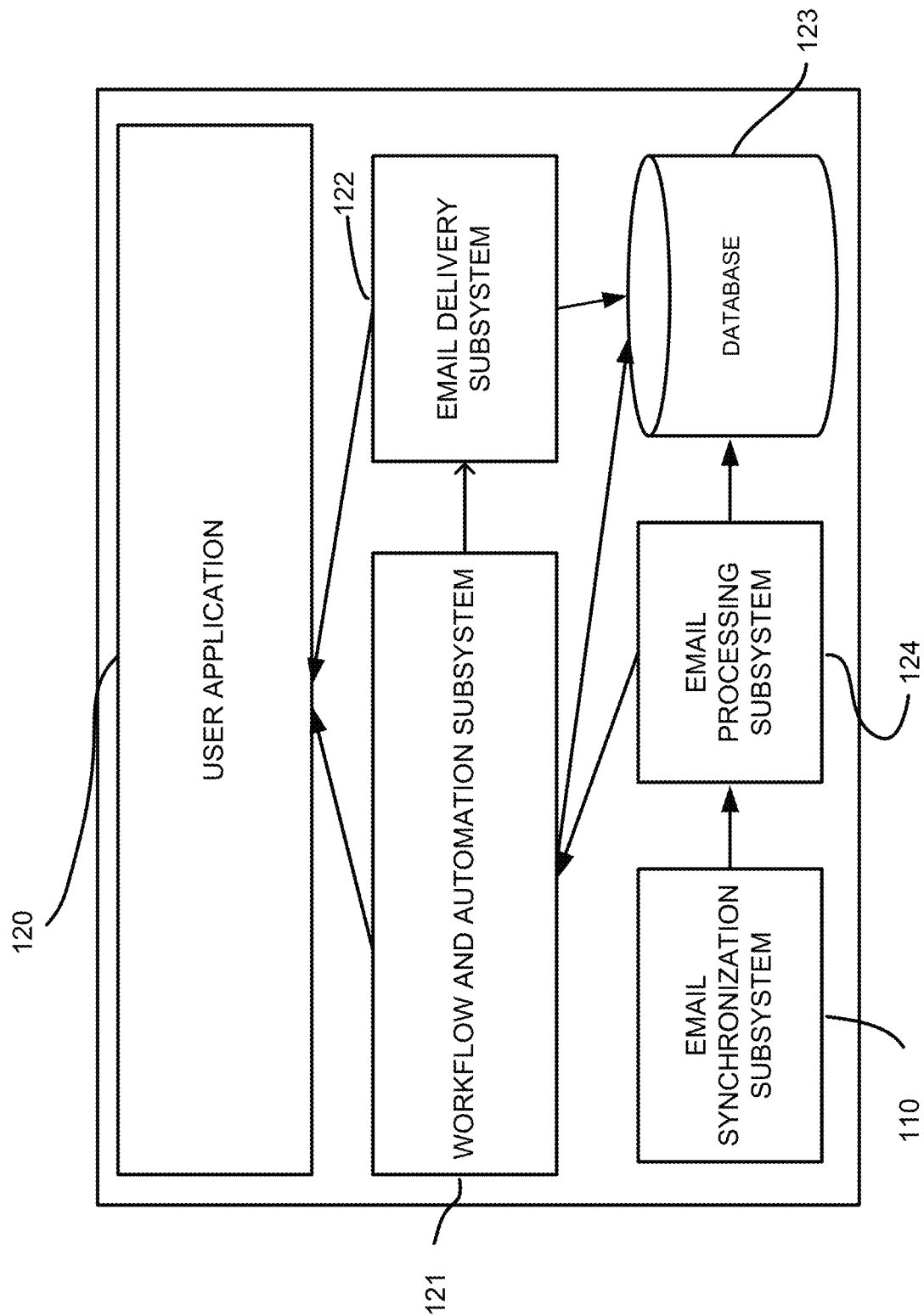
FIG. 1b is a schematic diagram showing an internal view of the various subsystems in accordance with the present invention.

In a typical application, a user 104*a* may provide a list of prospects 101*a*, 101*b*, 101*c*, 101*d*, and 101*e* to the synchronization and workflow system 100 in the form of a Comma Separated Value (CSV) spreadsheet. Referring to FIG. 1*b*, prospects 101*a*, 101*b*, 101*c*, 101*d*, and 101*e* may also be automatically generated based upon queries to a database 123 or based upon queries to a separate customer relationship management system, such as salesforce.com.

Figure 2:
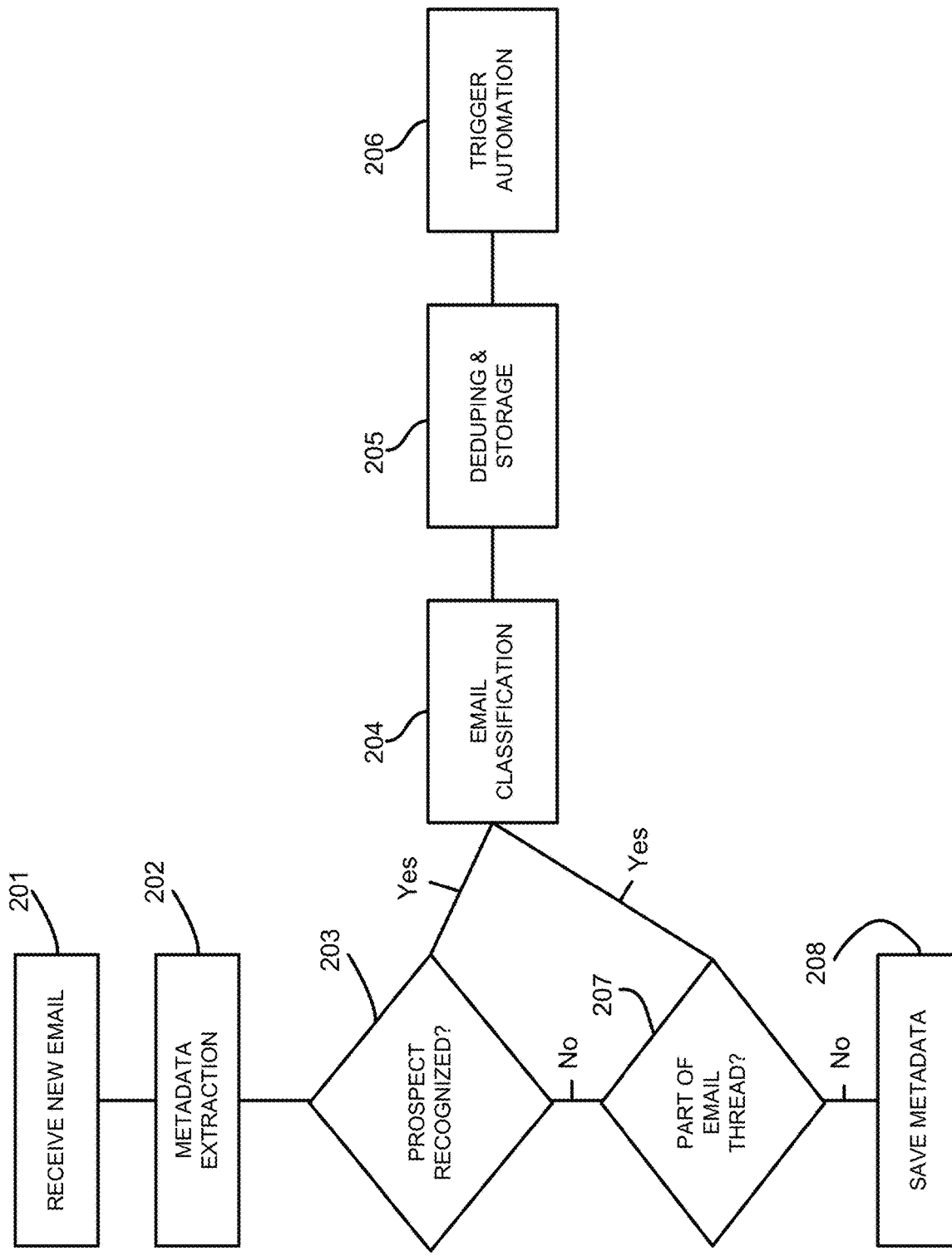
FIG. 2 is a flow chart illustrating how an embodiment of the system processes emails to determine next steps and actions to be taken in accordance with the present invention.

FIG. 2 illustrates a flow chart of one method of processing and storing emails received from the email synchronization subsystem 110. The method shown in FIG. 2 includes the steps involved in both determining which prospects 101*a*, 101*b*, 101*c*, 101*d*, and 101*e* (if any) are associated with a given email 112*a* as well as the storage of said emails in the database 123. More generally, the drawing shown in FIG. 2 relates to the email processing subsystem 124 shown in FIG. 1*b*.

Referring to FIG. 2, in step 201 the emails 112*a*, 112*b*, 112*c*, 112*d* and 112*e* received from the synchronization subsystem 110 are continually received and processed. The first procedural step 202 is to extract metadata about an email 112*a* from the RFC 2822 email headers associated with the email 112*a*. The TO, FROM, CC, and BCC headers are used to determine which users 104*a*, 104*b*, 104*c* and 104*d* and which prospects 101*a*, 101*b*, 101*c* and 101*d* are associated with the email 112*a* based on an email address match. In step 203, the system checks for the existence of a related prospect 101*a*, 101*b*, 101*c* or 101*d*. If a prospect 101*a*, 101*b*, 101*c* or 101*d* is not related to an email 112*a*, then step 207 checks to see if an email 112*a* is part of a larger email thread. In this method, the IN-REPLY-TO RFC 2822 email header is recursively checked to see if this email 112*a* is part of a larger email thread. If any previous email contains a reference to a prospect 101*a*, 101*b*, 101*c* or 101*d*, then this email 112*a* is considered to be indirectly related to that prospect 101*a*, 101*b*, 101*c* or 101*d*, respectively.

In this particular method, if none of the aforementioned steps 207 and 203 result in a related prospect 101*a*, 101*b*, 101*c* or 101*d*, this email is then stored in a database 123 and no further processing is done, as indicated in step 208.

In practice, email data is of the most sensitive kind with respect to customer privacy. It is thus desirable that emails 112*a*, 112*b*, 112*c*, 112*d* and 112*e* that are not directly related to the sales process (as determined by being related to a prospect 101*a*, 101*b*, 101*c* or 101*d*) are not stored in a way that preserves their contents. One method would be to simply not store the email 112*a*, 112*b*, 112*c*, 112*d* or 112*e* at all, but this loss of information can be undesirable for other parts of the system. Instead, to achieve this, in step 208, only the metadata about such emails 112*a*, 112*b*, 112*c*, 112*d* or 112*e* is stored. This metadata includes the RFC 2822 Message-ID as well as the MD5 hash of the subject and recipients. Although in this particular embodiment an MD5 hash is used, any other cryptographic hash function could be employed.

If a prospect 101*a*, 101*b*, 101*c* or 101*d* is related to an email 112*a*, 112*b*, 112*c*, 112*d* or 112*e* (as determined by steps 203 or 207), then the system attempts to derive additional information about the email 112*a*, 112*b*, 112*c*, 112*d* or 112*e*, respectively, in the form of a classification. One such embodiment of a classification system is to use a rule-based system wherein an order set of conditions maps directly to a classification. Such an embodiment is represented in FIG. 3.

As shown in FIG. 3, if an email 112*a* contains a subject that is prefixed with "Ooto", "Auto:", "Ooo", then the classification of the email will be Out of the Office (OOTO). If the email subject contains in any part of its contents "automatic reply", "auto response", "out of office", "out of the office", "away from my mail", "on leave", or "sick leave", then the email 112*a* will be classified as OOTO. If the first 80 characters of the body contains "out of office", "out of office", "away from mail", "on leave", "sick leave", or "maternity leave", then the email 112*a* will be classified as OOTO.

Also as shown in FIG. 3, if an email 112*a* has an RFC 2822 header named "Auto-submitted" with a value of "no" or any header named "x-autoreply", "x-autorespond", "x-mdautoresponse" exists, then the email will also be classified as Out of the Office. If the sender email address begins with "Mailer-daemon", "Mailerdaemon", or "postmaster", then the email 112*a* will be classified as Bounce. If the subject is prefix with "Undeliverable", "failed mail", "failed delivery", "mail delivery fail", "mail system error", "failure notice", "Nondeliverable", or "delivery status notification (failure)", then the email 112*a* will be classified as Bounce.

In FIG. 3, it is also shown that in this particular method, if the RFC 2822 IN-REPLY-TO or REFERENCES header of a particular email 112*a* contains a Message-ID stored in the database 123, then the email 112*a* is classified as Reply. When the email delivery subsystem 122 sends messages, it includes textual metadata in the body. If this metadata is present, then the email 112*a* is classified as Reply. If the email 112*a* contains an identical subject and recipient as a previous message delivery, then this email 112*a* is classified as Reply.

In the above embodiment as represented by FIG. 3, all rules are specific to the English language, but would be equally applicable in other languages. In a preferred method, the rules would be extended to include other language equivalents. For instance, "out of the office" would also include a rule to match "ausserhaus" in the German language.

Although reference is made herein to a heuristic rule-based system for email classification in this particular embodiment, other systems, such as statistical methods based on machine learning techniques, would also be applicable. For instance, a logistic regression model or neural network could be trained on a large number of sample email classifications in order to create a model that could be used to classify future emails.

Referring to FIG. 2, email messages 112*a* which are related to prospects 101*a*, 101*b*, 101*c*, 101*d*, or 101*e* in the system are stored in database 123, as represented by step 205. Email messages 112*a* are multi-threaded and may contain multiple recipients. As such, each inbound message 112*a*, 112*b*, 112*c*, 112*d* and 112*e* may exist in multiple inboxes 111*a*, 111*b*, 111*c* and 111*d*, and be related to multiple prospects 101*a*, 101*b*, 101*c*, 101*d*, and 101*e*. In this example, such messages 112*a*, 112*b*, 112*c*, 112*d* and 112*e* will all share the same RFC 2822 Message-ID. In this particular embodiment of the system, the storage 123 uses a simple deduplication method that ensures that each Message-ID only exists once in the database 123.

Prior to this invention, most third party systems acting on behalf of inboxes which attempt to receive replies to messages utilize the RFC 2822 REPLY-TO and SENDER headers. In practice, it has been found that this method provides very low accuracy. In the industry this can be as low as 30%. This is due to those headers being of particular interest to spam catching engines such as SpamAssassin. Moreover, these methods can have significant impacts on the sender's email reputation. This invention provides a significant advantage over such conventional methods and provides reply detection accuracies as high as if the user sent the email 112*a* manually; and the present invention has a marginal impact on email reputation.

Figure 6:
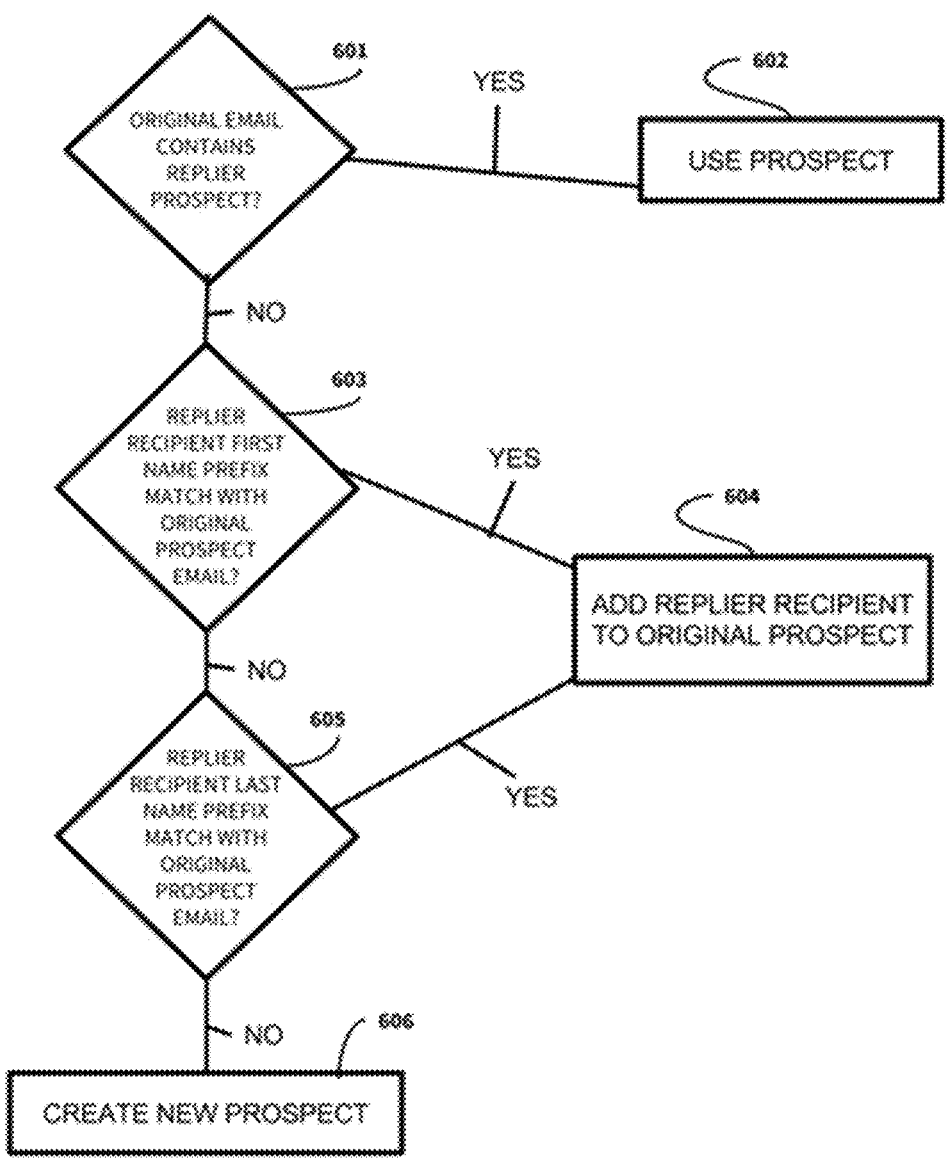
FIG. 6 is a flowchart illustrating how an embodiment of the system takes in data to create new identities or reconcile existing identities.

In practice, when sending email communications, it is not uncommon for a recipient to respond to an email 112*a* with a different email address than that which was specified as the "to" recipient. This may apply to an outbound email 112*b* sent to a prospect 101*b* as well, where the prospect 101*b* responds with a different email address than that which was specified as the "to" recipient in the email 112*b* sent to the prospect 101*b*. In this case, it is desirable for the system to correctly establish this new email address as corresponding to the original prospect 101*b*. FIG. 6 is a chart that represents an embodiment providing such functionality.

The chart represented by FIG. 6 shows steps necessary to determine indirect relationships between an inbound email 102*a* and a prospect 101*c* when there is not an exact email address match to existing prospects 101*a*, 101*b*, 101*c*, or 101*d*. As shown in step 601, this logic is not necessary if the prospect 101*a* replies with the original "to" email 102*a* and we have a direct match, in which case the system proceeds to step 602. However, if there is no match to the prospect 101*c*, the system proceeds to step 603. Steps 604 and 605 illustrate the core logic of this embodiment: if the inbound email 112*a* has a FROM address containing a character match with the first or last name of the original prospect 101*c*, then the system associates this new email address with the pre-existing prospect 101*c*. If neither first nor last name match with a preexisting prospect 101*a*, 101*b*, 101*c*, or 101*d*, the system proceeds to step 606, at which point the system creates an entirely new prospect 101*e* and associates the new prospect 101*e* with the inbound email 112*a*.

While the present description of an embodiment of the invention uses the example of a business that sells to potential customers over email, the usefulness of the present invention is not limited to an email sales environment. In most business environments, having conversations with existing customers, potential partners, and general communication is vital to the success of the business. The present invention may be useful in any environment in which communication by email is employed for any purpose.

Figure 4:
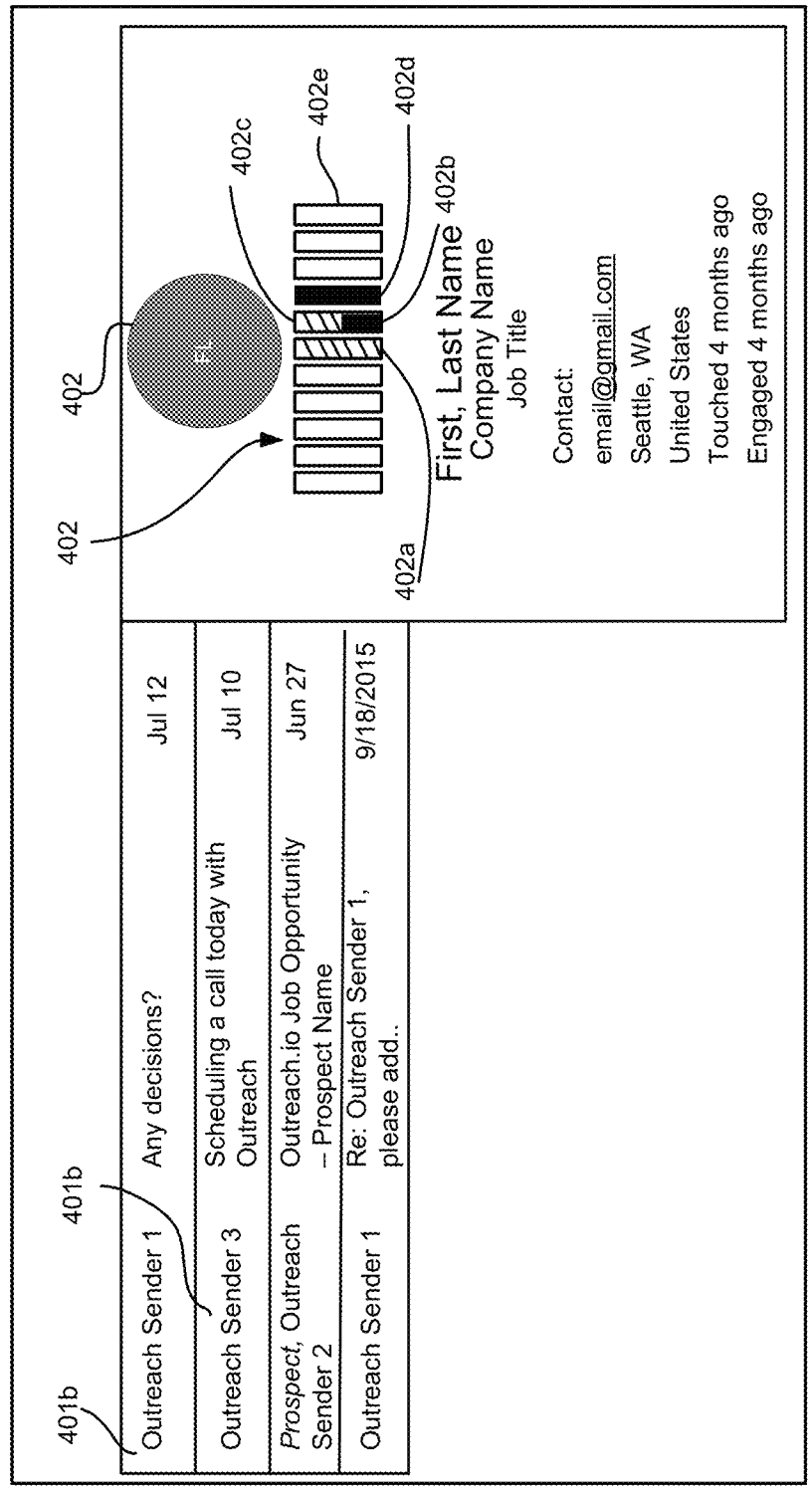
FIG. 4 illustrates a shared inbox view of a particular known prospect, pulling in email data from multiple mailboxes.

FIG. 4 illustrates a shared inbox view of a particular known prospect 101*a*, displaying email data from multiple mailboxes 111*a*, 111*b*, and 111*c*. It is common for multiple users 104*a*, 104*b*, 104*c*, and 104*d* to communicate to the same prospect 101*c*, and it is beneficial for users 104*a*, 104*b*, 104*c*, and 104*d* to be aware of this. For example, sender 401*a* can see that sender 401*b* has also been communicating with the prospect 101*c*, and for that reason, might choose not to engage in a particular email communication with that prospect 101*c* under certain circumstances. For example, sender 401*a* might not send a particular introductory offer to prospect 101*c* if the prospect 101*c* has already received the same offer from sender 401*b*. In practice, it has been found that more visibility allows a user 104*a* to make smarter decisions when it comes to engaging with a particular prospect 101*c*.

FIG. 4 includes a histogram 403 showing inbound and outbound communication history over a twelve month period with the prospect 101*c*, across all users' mailboxes 111*a*, 111*b*, 111*c*, and 111*d*. In the histogram 403, each empty bar represents a month, with the furthest right bar 402*e* being the current month. In the histogram 403, the bars 402*b* and 402*d* shown in black, in whole or in part, depict a graphical representation of outbound communication. In the histogram 403, the bars 402*a* and 402*c* shown as having dashed portions depict a graphical representation of inbound communication. If there was no communication in a given month, that fact will be graphically depicted in the histogram 403 as an empty bar 402*e*. This allows a user 104*a* at a glance to see the last time a prospect 101*c* was communicated with, and also the frequency of communication in the past. A responsive prospect would show a relatively balanced collection of black bars 402*b* and 402*d* with dashed bars 402*a* and 402*c*, where as an unresponsive prospect would show very little (if at all) dashed bars 402*a* and 402*c*.

Figure 5:
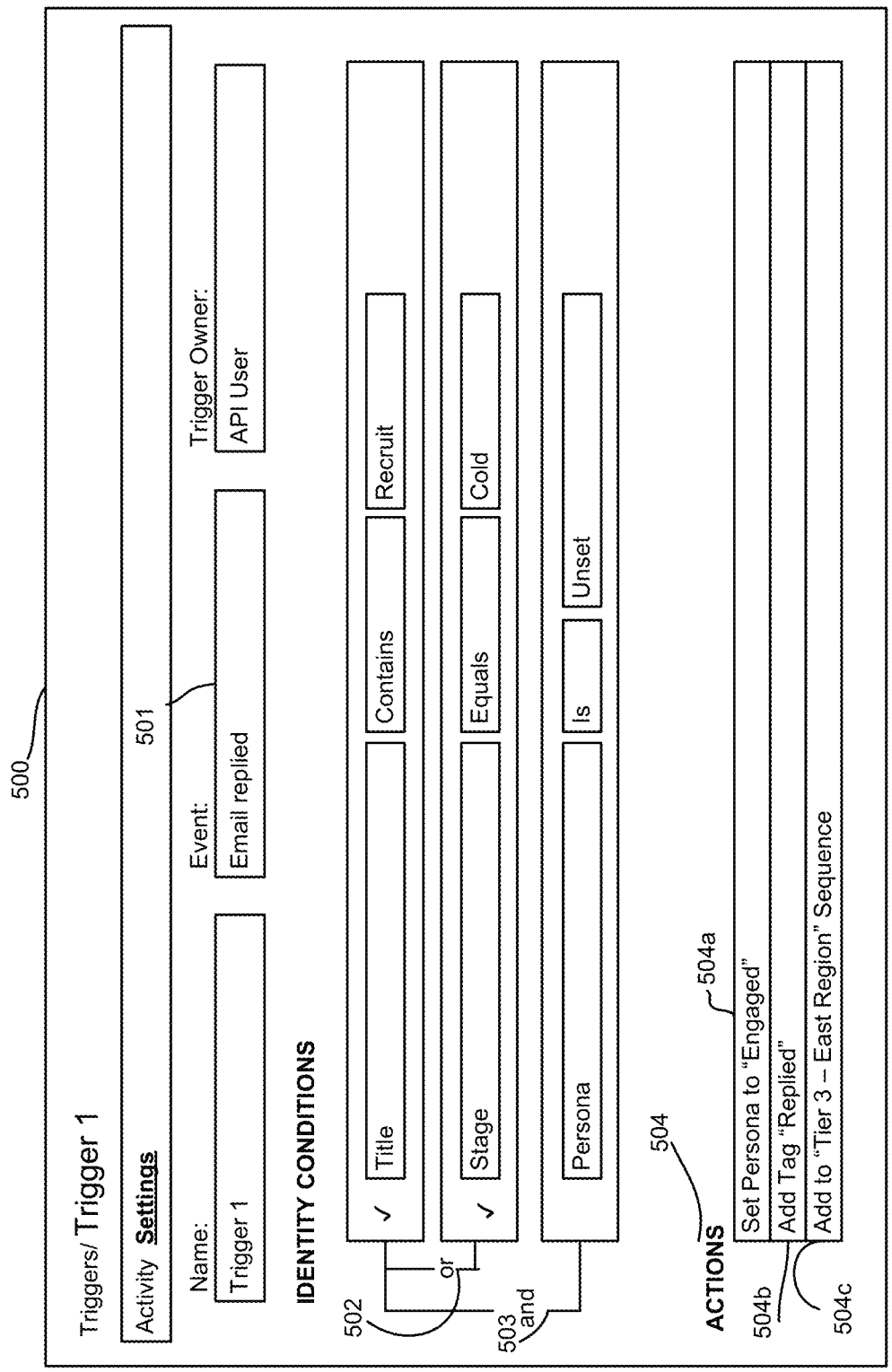
FIG. 5 illustrates a trigger system which executes actions based on email activity events.

Users often need the ability to execute specific actions based on events triggered from the Workflow System 100. Users can create Triggers to achieve this, which are a significant component to system 121. FIG. 5 is an example of a Trigger 500 created to update prospect information when an outbound email 103*a* is marked as replied 501 and specific prospect conditions 502 and 503 are met. In this example, these prospect conditions 502 and 503 must be met before the system will run the actions 504 shown in FIG. 5. Logical operators may be used to combine multiple conditions. In the illustrated example, the first two listed conditions 502 are: Prospect Title contains "Recruit" OR Prospect Stage equals "Cold". The first two conditions 502 are logically OR'ed together, meaning that if either condition occurs a logical "true" condition exists for those two. Then, those two conditions 502 are combined in the illustrated example with a third condition 503, which is Prospect Persona is unset. In this example, the third condition 503 is logically AND'ed with the first two conditions 502. Thus, the conditions 502, 503 for generating the action 504 are met in this example if either of the first two conditions 502 is true, and the third condition 503 is also true. The fields labeled "Title", "Stage", and "Persona" in FIG. 5 are examples of fields provided in the database 123 for data associated with a known prospect 101a, 101b, 101c and 101d.

Assuming these conditions are met as required by the specified logical operators, the following actions 504 shown in the example illustrated in FIG. 5 are executed in order: Set Prospect Persona to "Engaged" 504a. Add a tag of "Replied" to Prospect 504b. Then, Add the Prospect to the "Tier 3—East Region" Sequence 504c.

Users 104a, 104b, 104c, and 104d are able to set any combination of conditions and actions, allowing for a very powerful automation layer. The Workflow System 100 creates a variety of events Triggers can listen to, including: Email Delivered; Email Replied 501; Email Bounced; Email marked as Out of the Office; Prospect Created; and Prospect Updated.

Figure 7:
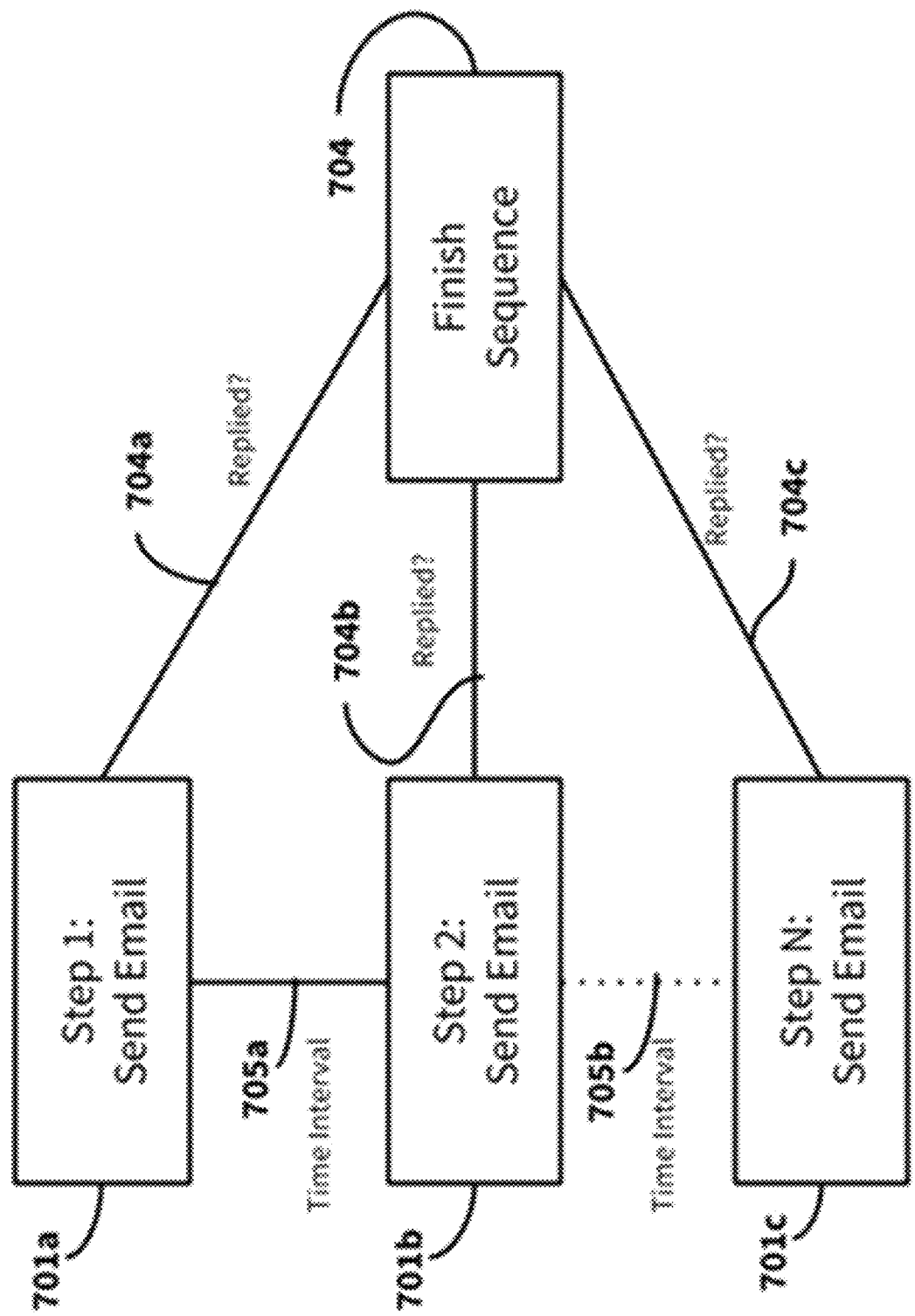
FIG. 7 is a flowchart illustrating a step-by-step email sequence to a given prospect, and how a single reply from the prospect finishes the sequence.

Sequences are an important feature of the workflow and automation system 121. FIG. 7 illustrates a sequence, which is a series of outbound emails 103a, 103b, 103c, and 103d designed to be sent to a prospect 101d, spaced out by predetermined time intervals 705a and 705b. Each sequence step can configure its own time interval 705a or 705b. When a prospect 101d is added to a sequence, the system starts at step 701a shown in FIG. 7. Step 701a delivers an email 103a to the prospect 101d and waits a set interval 705a for a reply. If no reply has been synced from system 110, the prospect 101d advances to step 701b and another email 103b is delivered to the prospect 101d. Again, the sequence waits another set interval 705b for a reply. If no reply is received, the prospect 101d advances to step 701c, and so on, until the prospect 101d has been through every step of the predetermined sequence.

If the prospect 101d replies in response to the email 103a sent in step 701a, the system 110 associates the reply with the prospect 101d in step 704a. If the prospect 101d replies in response to the email 103b sent in step 701b, the system 110 associates the reply with the prospect 101d in step 704b. If system 110 does sync a reply from the prospect 101d associated with any email 103a, 103b, etc., the prospect 101d is marked as finished in the sequence at step 704. When a prospect 101d is marked as finished, the prospect 101d will no longer receive any more emails from the sequence.

Expanding on sequence step intervals, users 104a, 104b, 104c, and 104d can also set their own delivery schedule blocks, as illustrated in FIG. 9. Sequence schedule blocks allow a user 104a, 104b, 104c, or 104d to deliver emails 103a, 103b, 103c, and 103d on specific days and times. This prevents emails 103a, 103b, 103c, and 103d from being delivered during unrealistic hours, such as 1:00 AM on a Saturday.

For example, users 104a, 104b, 104c, and 104d can specify a delivery window of 9:00 AM-6:00 PM PST on Mondays, using delivery schedule blocks 902a and 901a shown in FIG. 9, and choose not to deliver on Saturdays, excluding delivery schedule blocks 901c and 902b shown in FIG. 9. If a sequence step schedules an email 103b to be delivered in an invalid schedule block 901b, the email 103b will be scheduled to deliver at the next valid time 901a and 902a. For example, if a sequence step schedules an email 103b to be delivered on Saturday, but delivery schedule block 901c shown in FIG. 9 is excluded as a valid delivery window, the email delivery will be pushed up to the next valid time, which in this example, would be Monday at 9:00 AM, corresponding to delivery schedule block 902a shown in FIG. 9.

Figure 8:
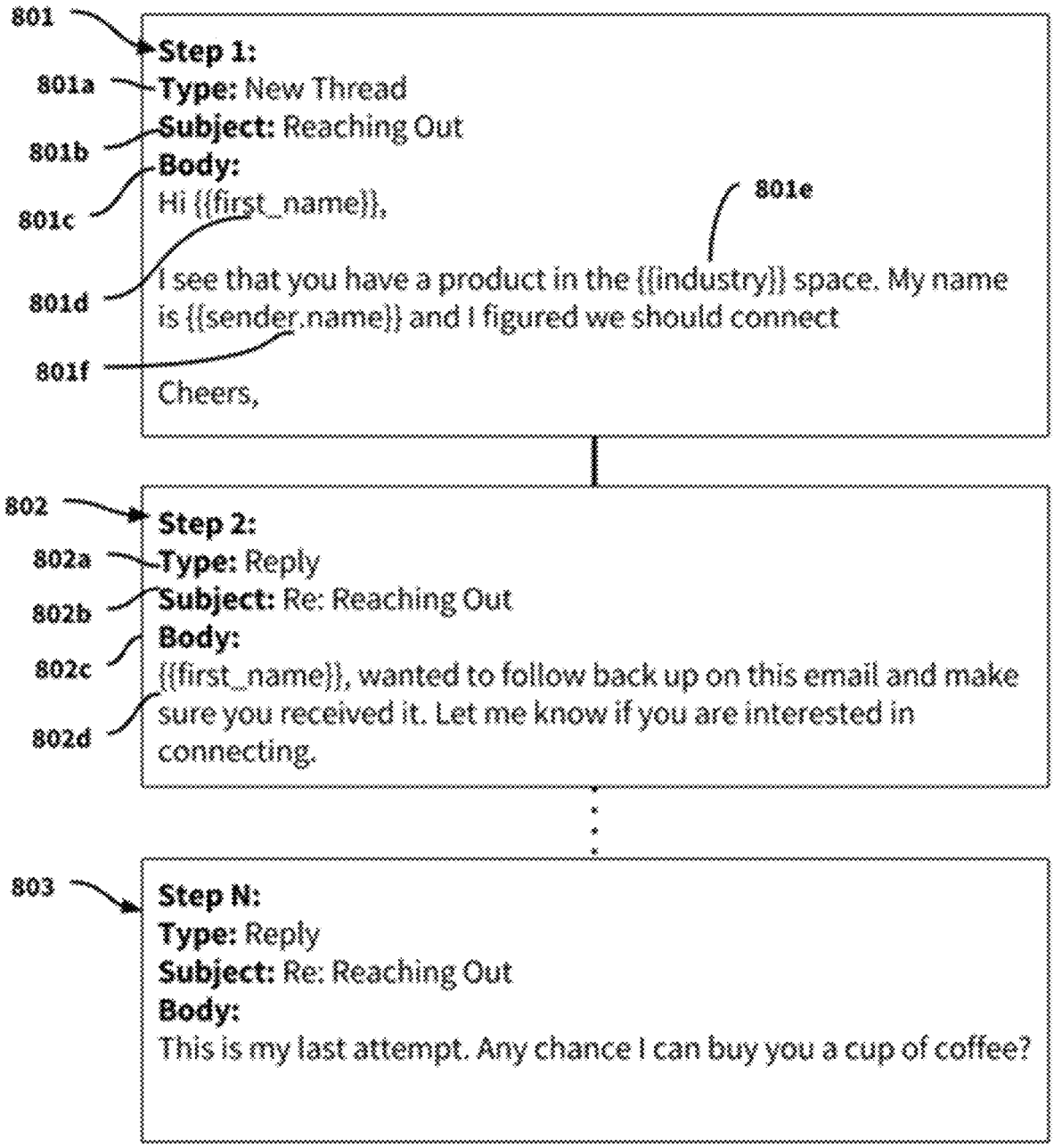
FIG. 8 is a flowchart illustrating a templating system preferably incorporated into email sequences.

Referring to FIG. 8, every sequence step maps to an email template 801 or 802, which contains a template type 801a and 802a, respectively, email subject 801b or 802b, respectively, and an email body 801c or 802c, respectively. A template type can either be a New Thread 801a or a Reply 802a. A New Thread template creates a brand new email thread, where as a Reply template replies to the previous email delivered. Because template 802 is marked as a Reply Template 802a, when an email 103b in accordance with template 802 is delivered, it will typically be a reply to an email 103a in accordance with template 801.

Both the template subject 801b and the template body 801c may contain template variables, shown in FIG. 8 with reference numerals 801d, 801e, and 801f. Template variables 801d, 801e, and 801f point to fields associated with a prospect 101b. For example, the "{{first_name}}" template variable 801d points to the "First Name" field on the corresponding prospect 101b. If the first_name of prospect 101b is "Joe", the variable "{{first_name}}" will be replaced with "Joe" when the template is compiled, shortly before delivery time via system 122. The fields labeled "first_name" and "industry" in FIG. 8 are examples of fields provided in the database 123 for data associated with a known prospect 101a, 101b, 101c and 101d, and the field labeled "sender.name" in FIG. 8 is an example of fields provided in the database 123 for data associated with a known user 104a, 104b, 104c, and 104d.

If a template variable does not exist on a particular prospect 101c, or there is a template compilation error, the associated email 103d will not be delivered. This is a safety setting in place to prevent delivering robotic looking emails, with uncompiled template variables. Users 104a, 104b, 104c, and 104d will need to manually fix these email drafts to continue a prospect 101a through a sequence.

The benefit of a sequence to the user 104a, 104b, 104c, and 104d is automated email follow-ups. Many times, it can take seven or more follow-up emails 103a, 103b, 103c, and 103d sent to a prospect 101a before the prospect 101a replies. Automating these follow-ups allows the user 104a, 104b, 104c, and 104d to communicate with more prospects 101a, 101b, 101c, and 101d and advantageously saves time.

Those skilled in the art, after having the benefit of this disclosure, will appreciate that modifications and changes may be made to the embodiments described herein, different design parameters and materials may be substituted, equivalent features may be used, changes may be made in the assembly, and additional elements and steps may be added, all without departing from the scope and spirit of the invention. This disclosure has set forth certain presently preferred embodiments and examples only, and no attempt has been made to describe every variation and embodiment that is encompassed within the scope of the present inven-

What is claimed is:

1. A method for automatically managing email communication between a user and a known prospect, the method comprising:
    detecting an email received at an email inbox of the user;
    extracting metadata from a header of the email;
    determining whether the metadata matches information in an entry of a database, the entry corresponding to the known prospect;
    responsive to determining that the metadata matches the information in the entry of the database:
        determining that the email is associated with the known prospect;
        determining a classification for the email; and
        storing the email to the database; and
    responsive to determining that the email is not associated with the known prospect:
        storing the metadata to the database without storing other contents of the email.

2. The method of claim 1, further comprising, responsive to determining that the metadata does not match the information in the entry of the database:
    determining that the metadata indicates that the email is part of an email thread;
    responsive to determining that the metadata indicates that the email is part of the email thread, determining whether the email thread comprises a reference to the entry of the database; and
    responsive to determining that the email thread comprises the reference to the entry of the database, determining that the email is associated with the known prospect.

3. The method of claim 1, wherein determining the classification for the email comprises:
    determining whether the email is a reply to another email; and
    responsive to determining that the email is the reply to the another email, classifying the email as being of a reply type.

4. The method of claim 3, wherein determining that the email is the reply to the another email comprises determining that a message identifier of the another email corresponds to a message identifier of the email.

5. The method of claim 3, wherein determining that the email is the reply to the another email comprises determining that the entry of the database includes the information corresponding to the metadata.

6. The method of claim 3, wherein determining that the email is the reply to the another email comprises determining that a previous email in the database includes an identical subject and recipient as the email.

7. The method of claim 1, further comprising:
    determining whether the email is a duplicate of another email; and
    responsive to determining that the email is the duplicate of the another email, deleting either the email or the another email from the database.

8. The method of claim 7, further comprising determining that the email is the duplicate of the another email based on the email and the another email sharing a same identifier.

9. A non-transitory computer-readable medium comprising memory with instructions encoded thereon for automatically managing email communication between a user and a known prospect, the instructions causing one or more processors to perform operations when executed, the instructions comprising instructions to:
    detect an email received at an email inbox of the user;
    extract metadata from a header of the email;
    determine whether the metadata matches information in an entry of a database, the entry corresponding to the known prospect;
    responsive to determining that the metadata matches the information in the entry of the database:
        determine that the email is associated with the known prospect; and
        determine a classification for the email;
        store the email to the database; and
    responsive to determining that the email is not associated with the known prospect:
        store the metadata to the database without storing other contents of the email.

10. The non-transitory computer-readable medium of claim 9, wherein the instructions further comprise instructions to, responsive to determining that the metadata does not match the information in the entry of the database:
    determine that the metadata indicates that the email is part of an email thread;
    responsive to determining that the metadata indicates that the email is part of the email thread, determine whether the email thread comprises a reference to the entry of the database; and
    responsive to determining that the email thread comprises the reference to the entry of the database, determine that the email is associated with the known prospect.

11. The non-transitory computer-readable medium of claim 9, wherein the instructions to determine the classification for the email comprise instructions to:
    determine whether the email is a reply to another email; and
    responsive to determining that the email is the reply to the another email, classify the email as being of a reply type.

12. The non-transitory computer-readable medium of claim 11, wherein the instructions to determine that the email is the reply to the another email comprise instructions to determine that a message identifier of the another email corresponds to a message identifier of the email.

13. The non-transitory computer-readable medium of claim 11, wherein the instructions to determine that the email is a reply to the another email comprise instructions to determine that the entry of the database includes the information corresponding to the metadata.

14. The non-transitory computer-readable medium of claim 11, wherein the instructions to determine that the email is the reply to the another email comprise instructions to determine that a previous email in the database includes an identical subject and recipient as the email.

15. The non-transitory computer-readable medium of claim 9, wherein the instructions further comprise instructions to:
    determine whether the email is a duplicate of another email; and
    responsive to determining that the email is the duplicate of the another email, delete either the email or the another email from the database.

16. The non-transitory computer-readable medium of claim 15, wherein the instructions further comprise instructions to determine that the email is the duplicate of the another email based on the email and the another email sharing a same identifier.

17. A system for automatically managing email communication between a user and a known prospect, the system comprising one or more processors configured to perform operations, the operations comprising:
- detecting an email received at an email inbox of the user;
- extracting metadata from a header of the email;
- determining whether the metadata matches information in an entry of a database, the entry corresponding to the known prospect;
- responsive to determining that the metadata matches the information in the entry of the database:
  - determining that the email is associated with the known prospect;
  - determining a classification for the email; and
  - storing the email to the database; and
- responsive to determining that the email is not associated with the known prospect:
  - storing the metadata to the database without storing other contents of the email.

18. The system of claim 17, wherein the operations further comprise, responsive to determining that the metadata does not match the information in the entry of the database:
- determining that the metadata indicates that the email is part of an email thread;
- responsive to determining that the metadata indicates that the email is part of the email thread, determining whether the email thread comprises a reference to the entry of the database; and
- responsive to determining that the email thread comprises the reference to the entry of the database, determining that the email is associated with the known prospect.

19. The system of claim 17, wherein determining the classification for the email comprises:
- determining whether the email is a reply to another email; and
- responsive to determining that the email is the reply to the another email, classifying the email as a reply type.

20. The system of claim 19, wherein determining that the email is the reply to the another email comprises determining that a message identifier of the another email corresponds to a message identifier of the email.

* * * * *